(12) United States Patent
McHugh

(10) Patent No.: US 9,568,109 B2
(45) Date of Patent: Feb. 14, 2017

(54) IN-LINE CONTROL VALVE

(71) Applicant: Cameron International Corporation, Houston, TX (US)

(72) Inventor: Edmund McHugh, Longford (IE)

(73) Assignee: Cameron International Corporation, Houston, TX (US)

( * ) Notice: Subject to any disclaimer, the term of this patent is extended or adjusted under 35 U.S.C. 154(b) by 52 days.

(21) Appl. No.: 14/176,558

(22) Filed: Feb. 10, 2014

(65) Prior Publication Data

US 2015/0226337 A1    Aug. 13, 2015

(51) Int. Cl.
| | |
|---|---|
| *F16K 47/08* | (2006.01) |
| *F16K 1/12* | (2006.01) |
| *F16K 31/54* | (2006.01) |
| *E21B 34/02* | (2006.01) |

(52) U.S. Cl.
CPC ............... *F16K 1/12* (2013.01); *E21B 34/02* (2013.01); *F16K 31/54* (2013.01); *F16K 47/08* (2013.01); *Y10T 29/49412* (2015.01)

(58) Field of Classification Search
USPC ............... 137/329.01–329.04, 625.3, 625.33
See application file for complete search history.

(56) References Cited

U.S. PATENT DOCUMENTS

| | | | | |
|---|---|---|---|---|
| 2,988,105 A | * | 6/1961 | Soderberg | ............... F16K 25/04 137/329.03 |
| 3,494,213 A | | 2/1970 | Schoenfeld | |
| 3,605,787 A | * | 9/1971 | Krogfoss et al. | ......... F16K 1/12 137/219 |
| 3,654,950 A | * | 4/1972 | Hamm | .................... F16K 1/123 137/219 |
| 3,765,642 A | | 10/1973 | Nelson | |
| 3,982,725 A | | 9/1976 | Clark | |
| 4,257,442 A | * | 3/1981 | Claycomb | ............... E21B 21/08 137/238 |
| 4,327,757 A | * | 5/1982 | Weevers | ................. F16K 47/08 137/219 |
| 4,508,138 A | * | 4/1985 | Dixon | ..................... F16K 47/04 137/239 |
| 4,588,164 A | | 5/1986 | Kemp | |
| 4,611,630 A | * | 9/1986 | Muchow | ................. E21B 34/04 137/219 |
| 4,617,963 A | | 10/1986 | Stares | |
| 4,635,678 A | | 1/1987 | Peterman et al. | |
| 5,490,535 A | * | 2/1996 | Fromm | ................... F16K 1/123 137/219 |

(Continued)

OTHER PUBLICATIONS

"Axial Control Valve," Brochure for Mokveld Valves BV, dated May 2013, 16 pages.

*Primary Examiner* — John Fox
(74) *Attorney, Agent, or Firm* — Eubanks PLLC

(57) ABSTRACT

Various control valves are provided. In one embodiment, a valve includes a hollow body with an inlet and an outlet along a common axis of the hollow body. A trim is disposed inside the hollow body along the common axis and includes a conduit and a sleeve disposed about the conduit to selectively cover fluid ports in the conduit. Further, the valve includes a pressure-balanced stem connected to the sleeve to enable the sleeve to be moved along the conduit via the stem. Additional systems, devices, and methods are also disclosed.

10 Claims, 8 Drawing Sheets

(56) References Cited

U.S. PATENT DOCUMENTS

| | | | |
|---|---|---|---|
| 6,220,272 B1 * | 4/2001 | Tavor | F16K 1/12 |
| | | | 137/219 |
| 6,772,783 B2 | 8/2004 | Etheridge | |
| 7,028,986 B2 | 4/2006 | Young | |
| 7,094,004 B2 | 8/2006 | Dunlop et al. | |
| 8,944,085 B2 * | 2/2015 | Smick | F16H 25/00 |
| | | | 137/15.18 |
| 2010/0186835 A1 | 7/2010 | Grace et al. | |

* cited by examiner

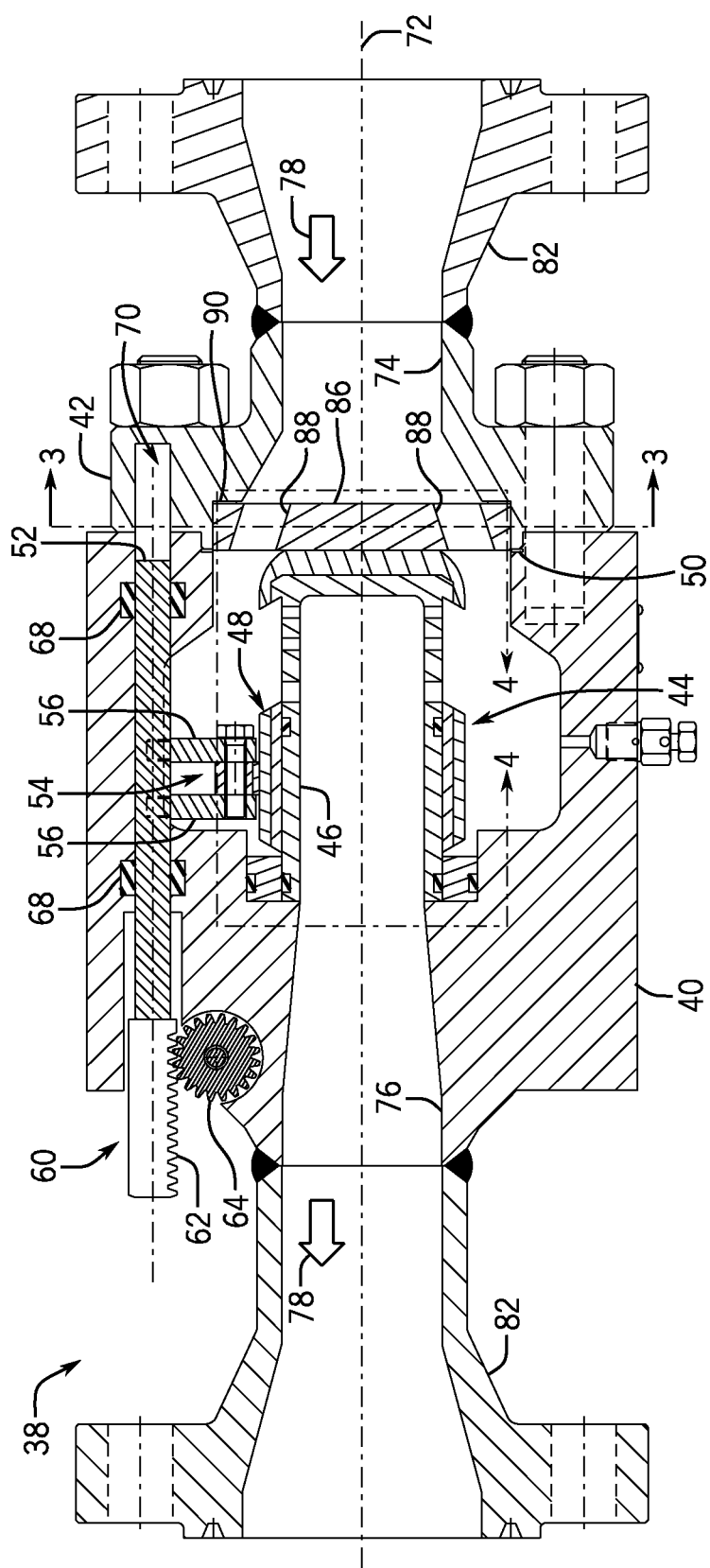
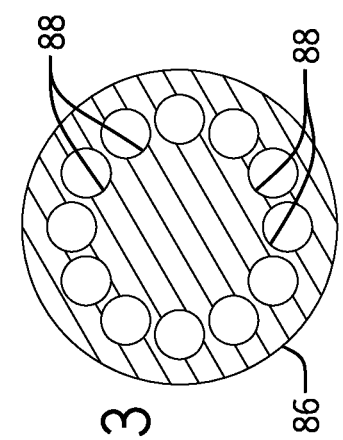
FIG. 2
FIG. 3

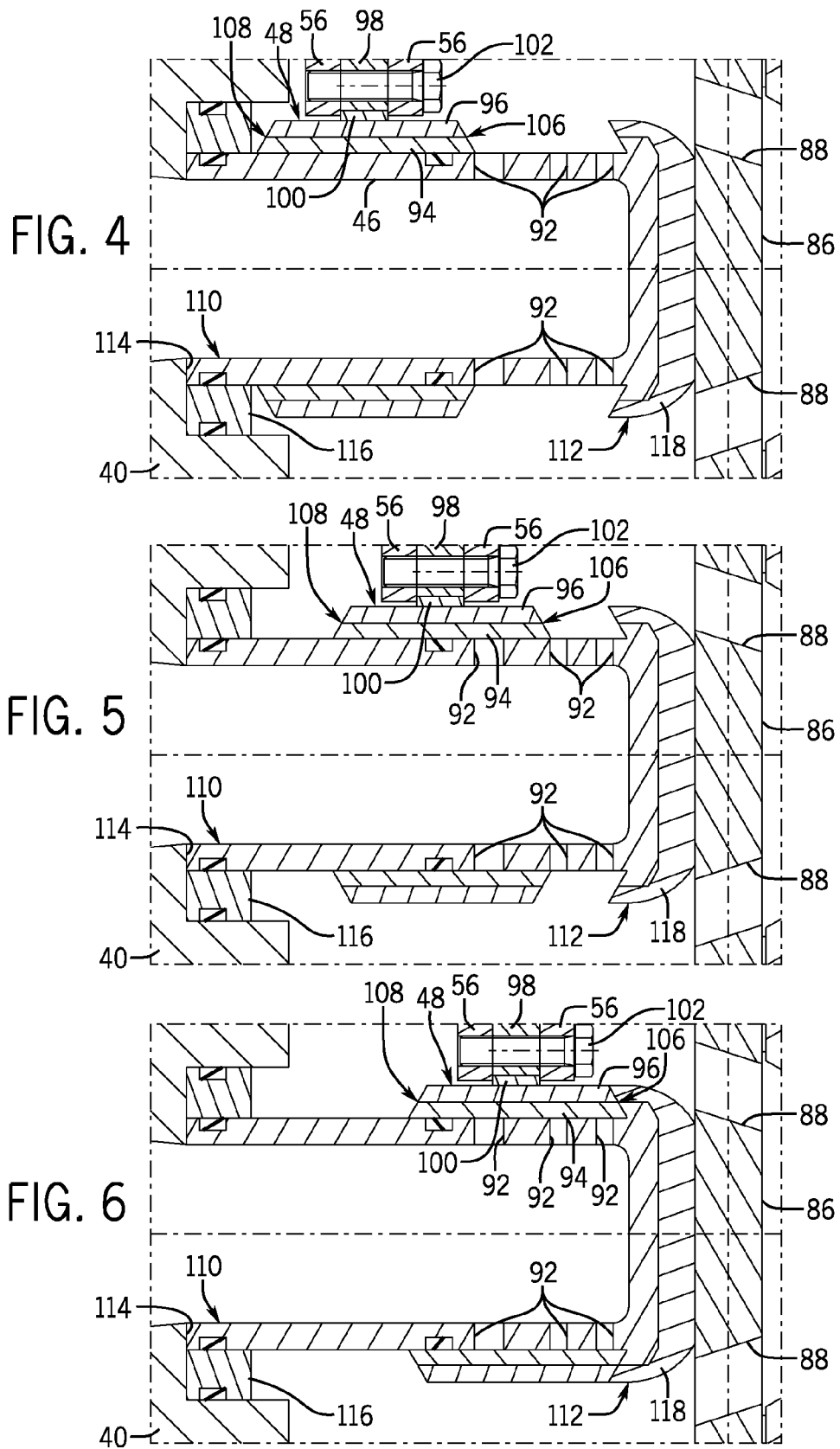

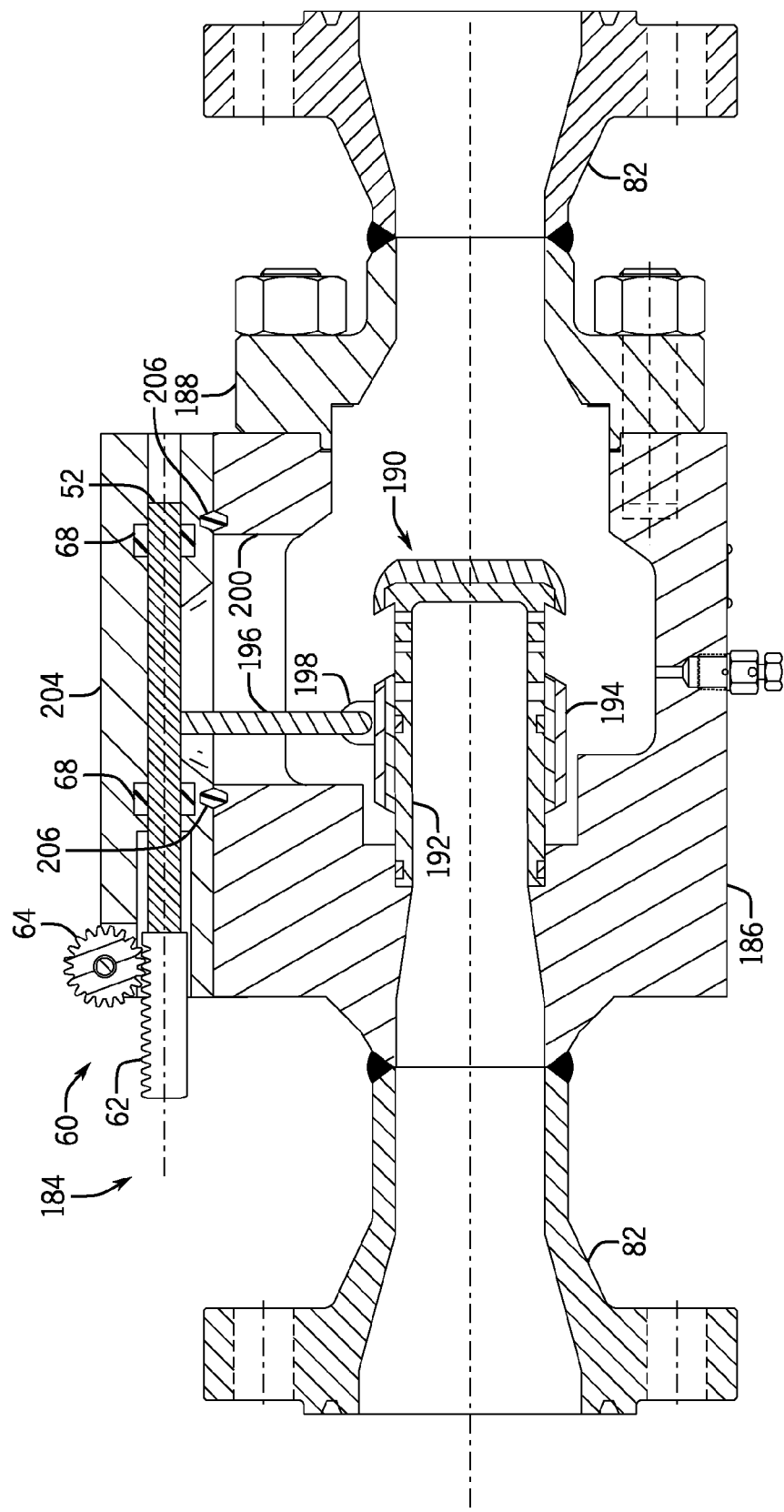

IN-LINE CONTROL VALVE

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often used to access and extract the resource. These systems may be located onshore or offshore depending on the location of a desired resource.

Further, such systems generally include a wellhead assembly mounted on a well through which the resource is accessed or extracted. These wellhead assemblies can include a wide variety of components, including chokes and other valves for regulating fluid flow. Various fluid conduits and other systems can also use valves and chokes in a similar manner. Such valves typically include internal components (i.e., trims) for selectively obstructing fluid passages to allow control of fluid flow through the valves.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to control valves for regulating the flow of fluids through conduits. In some embodiments, adjustable chokes or other control valves are provided as in-line valves having inlets, outlets, and trims positioned along common axes. The trims can be sleeve trims, each having a sleeve that can be moved to selectively cover fluid ports in a conduit to regulate flow. The sleeve can be reversible to allow either of two throttling edges to be moved across the fluid ports in the conduit. The sleeve can be controlled by an actuator via a stem. In some embodiments, the stem is pressure-balanced to facilitate actuation of the sleeve by the actuator.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 2 is a cross-section of an in-line control valve having a pressure-balanced stem and a sleeve trim in accordance with one embodiment;

FIG. 3 is a cross-section of an end plate for bracing a fluid conduit of the sleeve trim in accordance with one embodiment;

FIG. 4 is a detail view of the sleeve trim of FIG. 2 and depicts a sleeve in an open position to allow fluid to flow through ports of the fluid conduit in accordance with one embodiment;

FIG. 5 shows the sleeve of FIG. 4 moved into an intermediate position in which the sleeve covers some of the ports of the fluid conduit to limit flow through the ports;

FIG. 6 depicts the sleeve of FIGS. 4 and 5 moved into a closed position in which the sleeve covers the ports of the fluid conduit to stop flow through the ports;

FIG. 11 is a cross-section of the in-line control valve of FIGS. 9 and 10, further depicting a cap coupled to the valve body over the aperture, the cap having a pressure-balanced stem for actuating a sleeve of the sleeve trim, in accordance with one embodiment.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
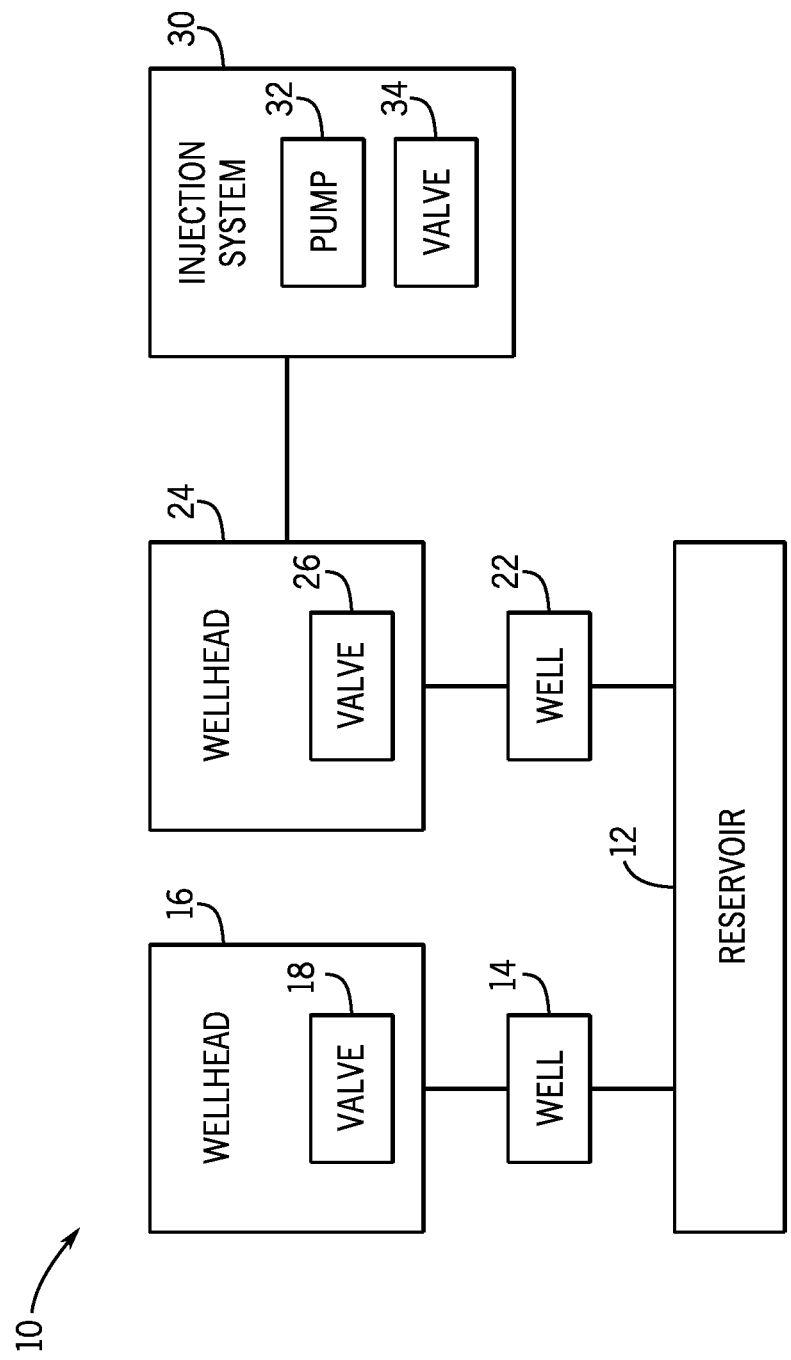
FIG. 1 is a block diagram of a system having various valves for regulating fluid flow in accordance with one embodiment.

Turning now to the present figures, a system 10 is illustrated in FIG. 1 in accordance with one embodiment. In some instances, the system 10 is a production system that facilitates extraction of a resource, such as oil or natural gas, from a reservoir 12 through a well 14. Wellhead equipment 16 is installed at the well 14. The wellhead equipment 16 can include valves 18 as well as other components (e.g., casing heads and a tubing head). The valves 18 regulate flow of fluids at the wellhead equipment 16. The valves 18 can include any of various types of valves, such as adjustable chokes and other control valves that can be actuated to change the rate at which fluid flows through their respective bodies.

A second well 22 is also shown in FIG. 1. Wellhead equipment 24 (including, for example, valves 26) is installed at the well 22, which is depicted as an injection well coupled to an injection system 30. The injection system 30, such as a water injection system in some embodiments, includes a pump 32 for pumping fluid into the well 22 via the wellhead equipment 24. In the case of water injection systems, the injected water can be used to increase reservoir pressure and to displace oil within the reservoir 12 and drive it toward the producing well 14, thereby enhancing production. A valve 34 regulates flow of the pumped fluid into the well 22. While certain valves are depicted here with a wellhead system, it will be appreciated that the presently disclosed valves can also be used with other systems, such as floating production, storage, and offloading vessels (FPSOs); processing systems; and so forth.

Like the valves 18, the valves 26 and 34 can also be provided in various forms. For instance, in some embodiments one or more of the valves 18, 26, and 34 can be provided as an in-line (or axial) control valve, an example of which is provided in FIG. 2 in accordance with one embodiment. The depicted control valve 38, which can be used as an adjustable choke or another control valve, includes a hollow main body 40 that houses an internal valve trim 44. As shown in FIG. 2, the valve 38 includes a bonnet 42 coupled to the main body 40. The bonnet 42 can be removed to facilitate installation of the trim 44 within the main body 40. A seal 50 is provided between the main body 40 and the bonnet 42 to prevent fluid from leaking out of the valve 38 between the main body 40 and the bonnet 42.

The valve trim 44 is depicted in FIG. 2 as a sleeve trim, which includes a fluid conduit 46 and a sleeve 48. As described in greater detail below, the sleeve 48 can be moved along the fluid conduit 46 to close ports in the fluid conduit 46 and control the rate at which fluid flows through the valve 38. The position of the sleeve 48 can be controlled through movement of a stem 52, which is shown here as connected to the sleeve 48 by a bracket 54. The bracket 54 can have any suitable configuration. For instance, in the present example the sleeve 48 is bolted to a pair of arms 56 of the bracket 54.

An actuator 60 is coupled to the stem 52 to control the position of the sleeve 48 along the fluid conduit 46. The actuator 60 can be provided in various forms, such as a rack gear 62 and a pinion 64 as depicted in FIG. 2. The pinion 64 can be rotated (e.g., with an electric motor or a handwheel) to cause linear movement of the rack gear 62 and the stem 52. The sleeve 48 moves with the stem 52, thus allowing the position of the sleeve 48 to be controlled through rotation of the pinion 64.

In at least some embodiments, the stem 52 is a pressure-balanced stem. For example, in FIG. 2, the valve 38 includes a pair of pressure-isolating seals 68. These seals 68 permit linear movement of the stem 52, but seal against the stem 52 to inhibit fluid from passing from the interior of the valve 38 along the stem 52. By isolating cavity 70 from the interior of the valve 38 with a seal 68, pressure in the cavity 70 can be maintained at the same level as outside the valve 38. Consequently, forces from pressure acting to push the stem 52 into or out of the cavity 70 are in equilibrium, thus reducing the magnitude of external actuation forces (e.g., from the actuator 60) needed to appropriately control the stem 52 for moving the sleeve 48 and regulating flow through the valve 38. This allows the use of a smaller actuator compared to other embodiments in which higher pressure on one end of the stem 52 would apply an axial biasing force that could act against the movement of the stem 52 by the actuator 60.

The valve 38 is an in-line valve (which may also be referred to as an axial valve) having an axis 72 common to both the valve inlet 74 and the valve outlet 76 to facilitate generally linear fluid flow, here represented by arrows 78, along the axis 72 through the valve 38. Flanged connectors 82 can be provided at the inlet 74 and the outlet 76 (e.g., welded to the main body 40 and the bonnet 42) and help in connecting the valve 38 to pipes or other components.

In at least some embodiments, the sleeve trim 44 is not free-ended. For example, as shown in FIG. 2, both ends of the fluid conduit 46 are braced against other components of the valve 38. This is in contrast to other configurations in which one end of the fluid conduit 46 is left unsecured within the valve 38, allowing the end of the fluid conduit 46 to vibrate freely. In some instances, excessive vibration can damage the trim. Bracing each end of the fluid conduit 46, such as in the manner depicted here, can increase impact and stress resistance of the sleeve trim 44.

An end plate 86 is provided in some embodiments to brace one end of the fluid conduit 46 within the valve 38. As depicted in FIGS. 2 and 3, apertures 88 allow fluid to pass through the end plate 86. In this manner, fluid can flow into the inlet 74, through the apertures 88, through ports in the fluid conduit 46, and out of the valve 38 through the outlet 76. A crushable spacer 90 can be positioned between the end plate 86 and the bonnet 42 to facilitate engagement of the end plate 86 with the end of the fluid conduit 46.

Additional details of the sleeve 48 and its operation may be better understood with reference to the detail views of FIGS. 4-6. In FIG. 4, the sleeve 48 is shown in an open position that allows maximum flow through ports 92 of the fluid conduit 46. In FIG. 5, the sleeve 48 is depicted in an intermediate position in which the amount of flow allowed through the ports 92 is reduced by covering some of the ports 92. In turn, FIG. 6 depicts the sleeve 48 in a closed position in which the sleeve 48 covers all of the depicted ports 92. While a handful of ports 92 are presently depicted, it will be appreciated that the fluid conduit 46 could have any suitable number of ports 92, and that these ports could have different sizes and be arranged at various positions about the fluid conduit 46.

In some embodiments, like that shown in FIGS. 4-6, the sleeve 48 includes an inner portion 94 and an outer portion 96. The inner portion 94 (as well as the fluid conduit 46) can be formed from a wear-resistant material, such as tungsten carbide or stainless steel. The outer portion 96 can also be made of metal, such as stainless or low-alloy steel, and be joined to the inner portion 94 in any suitable manner. The outer portion 96 can function as a carrier of the inner portion 94, facilitating connection of the inner portion 94 to the bracket 54. For example, a hub 98 coupled to the outer portion 96 (e.g., by weld 100) can be positioned between the arms 56 of the bracket 54 to allow a bolt 102 to be inserted through the arms 56 and the hub 98 to secure the sleeve 48 to the bracket 54. Once secured in this manner, the sleeve 48 can be translated along the fluid conduit 46 to selectively close the ports 92 by moving the stem 52.

As the sleeve 48 is moved between the open position of FIG. 4 and the closed position of FIG. 6, a throttling edge 106 of the sleeve 48 passes over ports 92 to obstruct flow through the covered ports. Fluid passing through the uncovered ports (and uncovered portions of partially covered ports) flows by the throttling edge 106, causing the throttling edge 106 to gradually wear. Excessive wear of the throttling edge 106 can negatively impact the performance of the valve 38. In at least some embodiments, however, the sleeve 48 is a reversible sleeve. That is, the sleeve 48 has a second throttling edge 108 on an opposite end from the throttling edge 106 and is removably coupled to the bracket 54 to enable the orientation of the sleeve 48 with respect to the fluid conduit 46 to be reversed. For example, when the throttling edge 106 is worn, the sleeve 48 can be removed from the bracket 54, reversed, and then reattached to the bracket 54 to enable the throttling edge 108 to instead move across the ports 92 to obstruct flow.

In the embodiment depicted in FIGS. 4-6, the fluid conduit 46 includes an open end 110 and a closed end 112. The open end 110 is positioned against a shoulder 114, and a spacer 116 generally maintains alignment of the fluid conduit 46 with the outlet 76 and along the axis 72. The closed end 112 is generally positioned against the end plate 86, as described above. More specifically, the closed end 112 can be braced by the end plate 86 directly or, as depicted in FIGS. 4-6, indirectly through an intermediate member (e.g., end cap 118).

Figure 7:
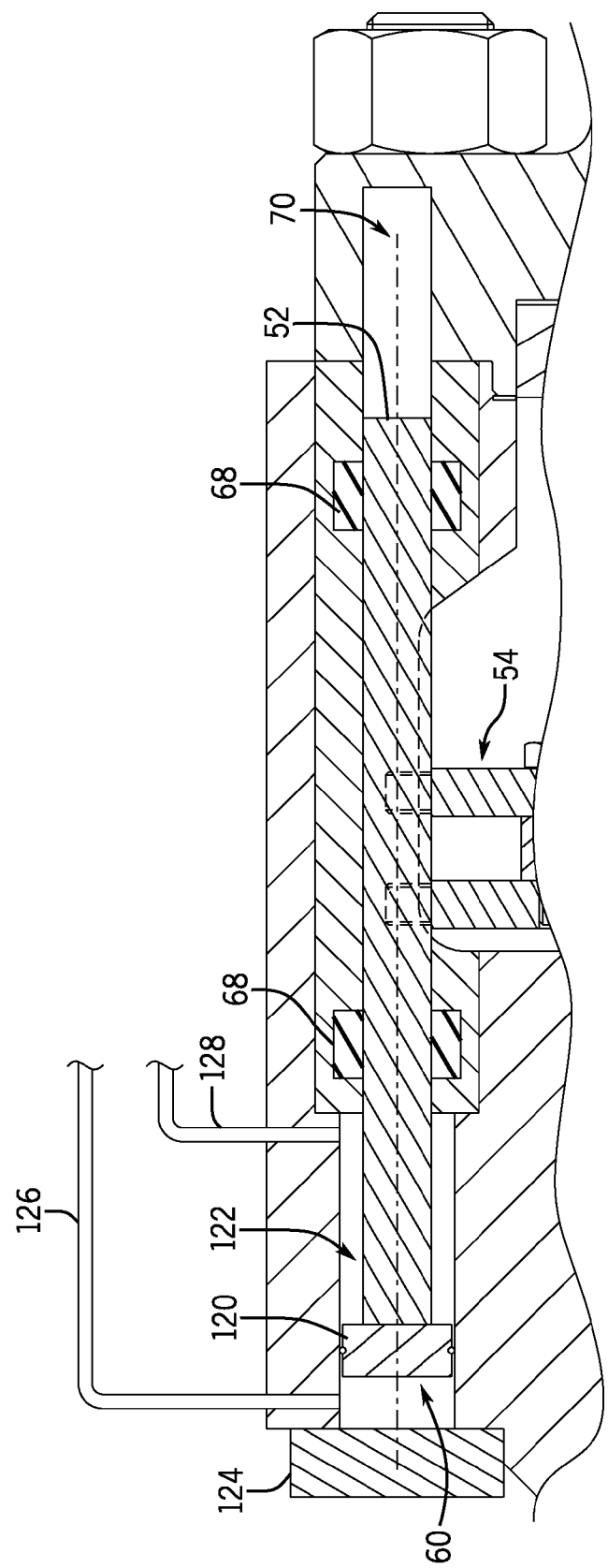
FIG. 7 depicts a pressure-balanced stem with a piston to facilitate hydraulic or pneumatic operation of the stem in accordance with one embodiment.

While the actuator 60 is depicted in FIG. 2 as having a rack-and-pinion arrangement, it is again noted that the actuator 60 could be provided in other forms. For instance, the stem 52 could be hydraulically or pneumatically actuated as depicted in FIG. 7. In this embodiment, the actuator 60 includes a piston 120 coupled to the stem 52 within a fluid chamber 122 sealed by cap 124. Control fluid can be pumped into the chamber 122 from supply lines 126 and 128 to control movement of the stem 52 and the attached sleeve 48. For instance, control fluid can be pumped into the chamber 122 from the supply line 126 to increase pressure on one side of the piston 120 and move the sleeve 48 toward its closed position. Conversely, control fluid can be pumped into the chamber 122 from the supply line 128 to increase pressure on the opposite side of the piston 120 and move the sleeve 48 toward its open position.

Figure 8:
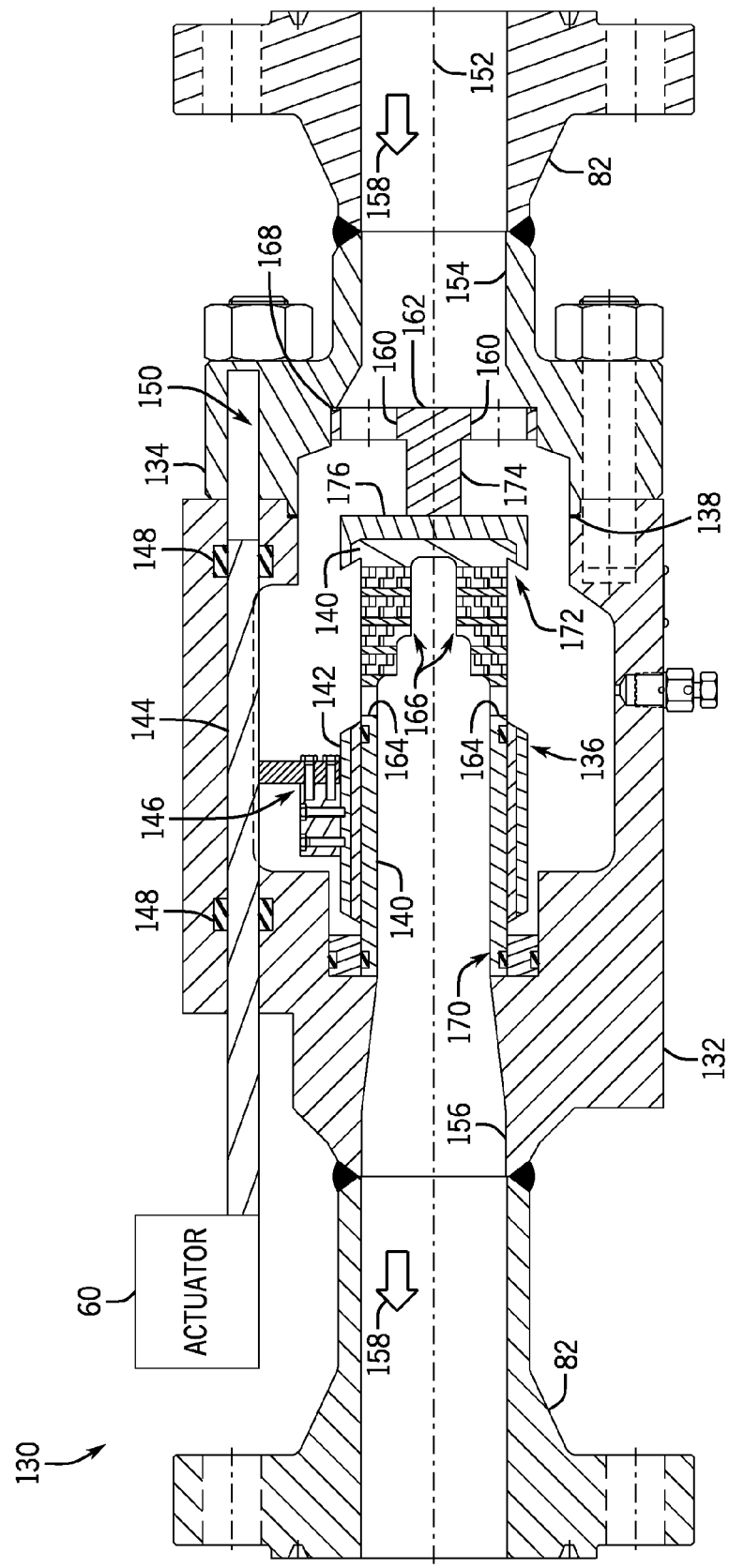
FIG. 8 is a cross-section of an in-line control valve having a sleeve trim with a cavitation-resistant fluid conduit in accordance with one embodiment.

A valve 130 is depicted in FIG. 8 in accordance with another embodiment. Like the valve 38, the valve 130 includes a hollow main body 132 and a bonnet 134. A bonnet seal 138 can prevent fluid from leaking out of the valve 130 between the bonnet 134 and the main body 132. The valve 130 also includes an internal trim 136 having a fluid conduit 140 and a sleeve 142. The sleeve 142 is actuated (by actuator 60) via stem 144, which is coupled to the sleeve 142 by a bracket 146. The bracket 146 is depicted as having an arm fastened to a hub, which is itself fastened to the sleeve 142, though the bracket 146 could instead be provided in the same form as bracket 54 or in some other form. The depicted stem 144 is a pressure-balanced stem, with pressure-isolating seals 148 that inhibit leakage of fluid into cavity 150 or out of the valve 130 along the stem 144. The valve 130 is also an in-line valve, with the trim 136, the inlet 154, and the inlet 156 generally provided along a common axis 152. And like valve 38, flow through the valve 130 is substantially linear, with fluid entering and exiting the valve 130 in a direction (generally represented by arrows 158) parallel to the axis 152. The valve 130 can also include an end plate 162 for bracing an end of the fluid conduit 140 so that the trim 136 is not free-ended. Apertures 160 permit fluid to pass through the end plate 162.

The fluid conduit 140 includes ports 164 and 166 for allowing fluid entering the valve 130 to pass into the conduit 140 and then exit the valve. During operation, a pressure gradient can be present between opposite sides of the ports 164 and 166 (i.e., within the conduit 140 and outside the conduit 140). Generally, a valve trim can obstruct fluid flow, causing fluid to accelerate and decrease in pressure as it passes through the trim. In some instances, this pressure drop can result in cavitation that increases wear on the trim. The valve 130, however, can include a multi-stage trim for reducing cavitation (which can also be referred to as a cavitation-resistant trim). Particularly, rather than running straight through the fluid conduit 140, the ports 166 can be provided with multiple stages following circuitous routes (with multiple turns) through the conduit for increasing the distance traveled by the fluid passing through the ports 166 and incrementally lowering the pressure of that fluid at each stage.

The fluid conduit 140 includes an open end 170 and a closed end 172. The open end 170 can be positioned against a shoulder of the main body 132 and the closed end 172 can be braced with the end plate 162. A crushable spacer 168 can be positioned between the end plate 162 and the bonnet 134 to facilitate engagement of the end plate 162 with the closed end 172 of the conduit 140. As depicted in FIG. 8, the end plate 162 braces the closed end 172 via a stem 174 and end cap 176. But in other embodiments the end plate 162 could be in direct contact with the closed end 172 or with the end cap 176 (i.e., without the stem 174).

Figure 9:
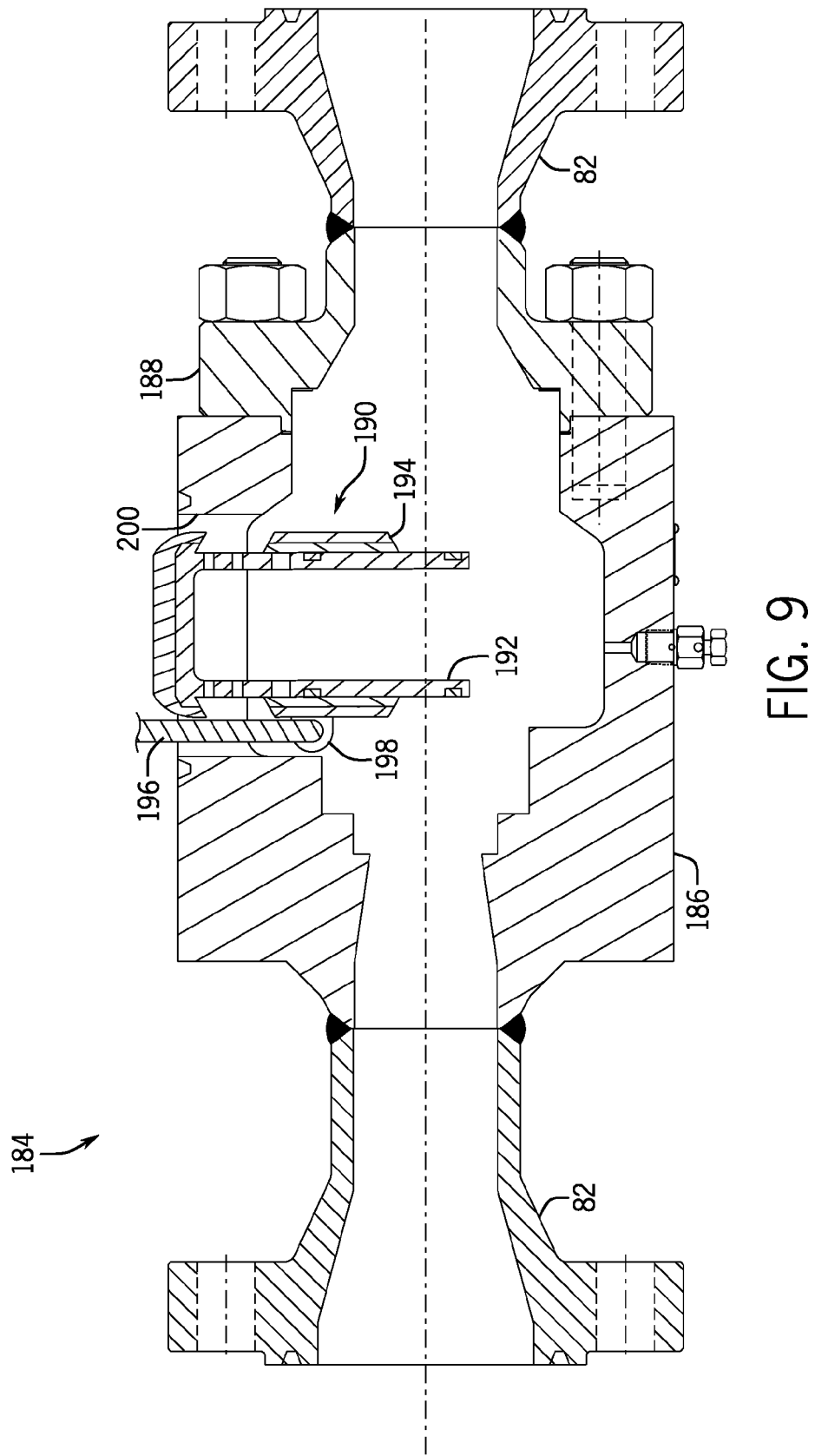
FIGS. 9 and 10 are cross-sections of an in-line control valve having an aperture in the side of the valve to enable a sleeve trim to be installed in the valve body through the aperture in accordance with one embodiment.
Figure 10:
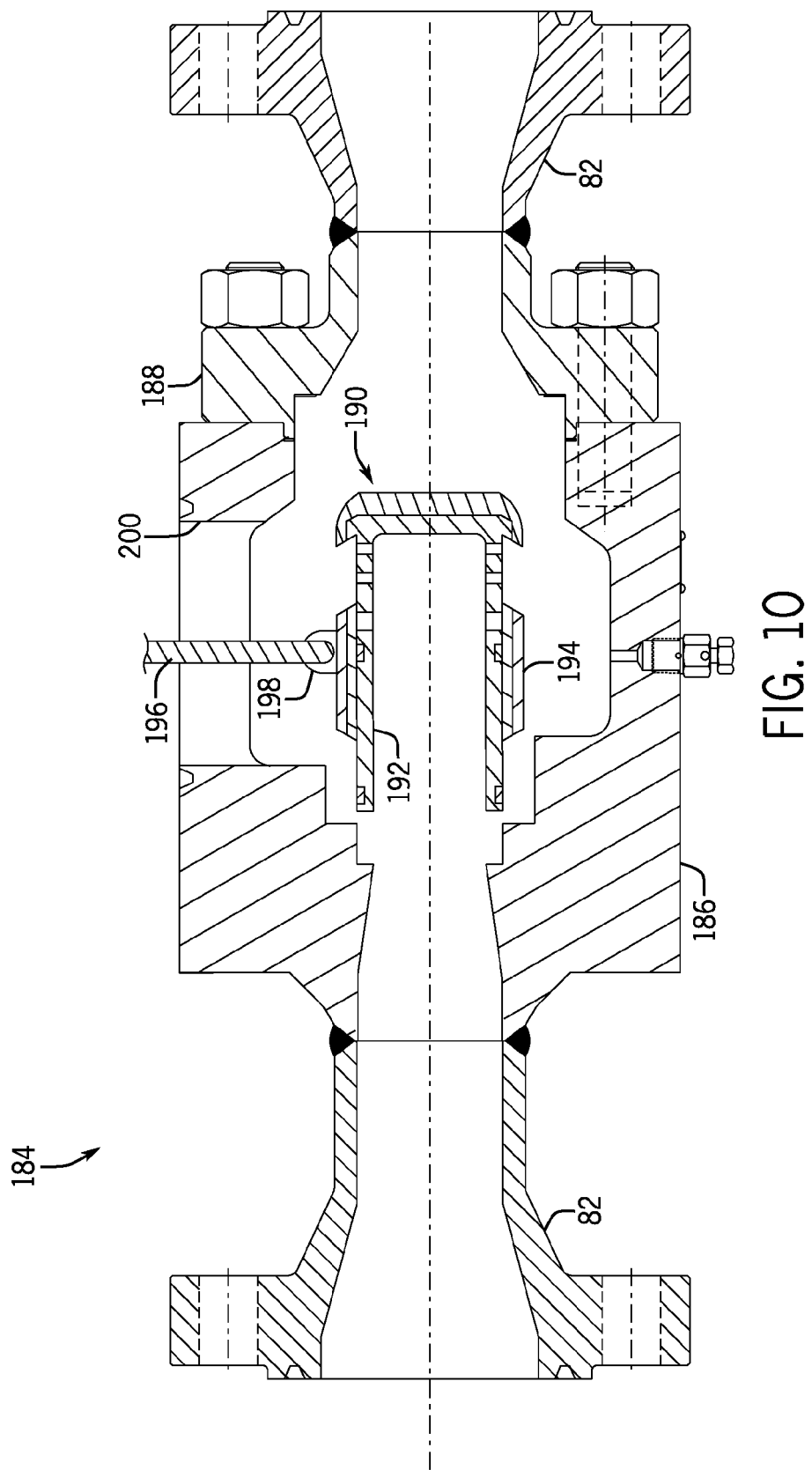

Another example of an in-line valve is depicted in FIGS. 9-11. In these figures, the in-line valve 184 includes a hollow main body 186, a bonnet 188, and an internal trim 190. The trim 190 is an external sleeve trim having a fluid conduit 192 with ports that can be selectively covered by a sleeve 194. The sleeve 194 is coupled to an arm 196 via a hinge 198, facilitating installation of the trim 190 through a side aperture 200 of the main body 186. Particularly, as shown in FIG. 9, the trim 190 can be inserted into the main body 186 through the side aperture 200. The trim 190 can then be rotated on the hinge 198, aligned with the axis of the valve 184 (as shown in FIG. 10), and positioned against the main body 186 (as shown in FIG. 11).

A cap 204 can be positioned over the side aperture 200. A gasket 206 between the cap 204 and the main body 186 inhibits leakage. The arm 196 is connected to a stem 52 within the cap 204, allowing the sleeve 194 to be moved along the fluid conduit 192 by an actuator 60 via the stem 52 and the arm 196. Although the actuator 60 is depicted here as including a rack gear 62 and a pinion 64, any suitable actuator could be used in other embodiments. Additionally, the stem 52 of the valve 184 can also be provided as a pressure-balanced stem with seals 68, as described above. In some instances the trim 190 can be free-ended, but in others the closed end of the sleeve 194 can be braced with an end plate or in some other manner.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A valve comprising:
    a hollow body with an inlet and an outlet along a common axis of the hollow body;
    a trim disposed inside the hollow body along the common axis, the trim including a conduit and a sleeve disposed about the conduit to selectively cover fluid ports in the conduit;
    a plate interposed between the conduit and a bonnet of the hollow body such that the plate braces a closed end of the conduit, the plate having apertures to permit fluid to pass through the plate; and
    a pressure-balanced stem connected to the sleeve to enable the sleeve to be moved along the conduit via the stem, wherein the pressure-balanced stem is a linearly actuated stem.

2. The valve of claim 1, comprising an actuator coupled to the stem.

3. The valve of claim 2, wherein the actuator includes a rack gear and a pinion.

4. The valve of claim 2, wherein the actuator includes a piston coupled to the stem and the stem is a hydraulically or pneumatically actuated stem.

5. The valve of claim 1, wherein the sleeve is removably fastened to the stem.

6. The valve of claim 5, wherein the sleeve includes a first throttling edge at one end and a second throttling edge at an opposite end to enable the orientation of the sleeve to be reversed with respect to the conduit.

7. The valve of claim 1, wherein the trim is a multi-stage trim to facilitate a reduction in cavitation in a fluid flowing through the multi-stage trim.

8. The valve of claim 1, wherein the hollow body includes an aperture located along the hollow body between the inlet and the outlet to enable the trim to be inserted into the hollow body through the aperture.

9. The valve of claim 1, wherein the valve is a choke.

10. The valve of claim 1, wherein the bonnet of the hollow body includes a recess to receive the linearly actuated stem.

* * * * *